United States Patent [19]
Creter

[11] Patent Number: 5,238,326
[45] Date of Patent: Aug. 24, 1993

[54] SUBMERGED BREAKWATER FOR USE AS A PERCH FOR SAND RETENTION

[76] Inventor: Richard E. Creter, 24 Timberwick Dr., Flemington, N.J. 08822

[21] Appl. No.: 862,852

[22] Filed: Apr. 3, 1992

[51] Int. Cl.$^5$ .............................................. E03B 3/06
[52] U.S. Cl. ....................................... 405/25; 405/31; 405/33
[58] Field of Search ................. 405/15, 21, 23, 25, 405/30, 31, 33, 34, 35

[56] References Cited

U.S. PATENT DOCUMENTS

| | | | |
|---|---|---|---|
| 4,498,805 | 2/1985 | Weir | 405/31 |
| 4,502,816 | 3/1985 | Creter et al. | 405/30 |
| 4,784,521 | 11/1988 | Martin et al. | 405/31 X |
| 4,804,294 | 2/1989 | Barthel | 405/30 |
| 4,818,141 | 4/1989 | Rauch | 405/30 |
| 5,011,328 | 4/1991 | Atkinson et al. | 405/30 |
| 5,120,156 | 6/1992 | Rauch | 405/25 |

*Primary Examiner*—David H. Corbin
*Attorney, Agent, or Firm*—Kenyon & Kenyon

[57] ABSTRACT

A breakwater that is formed from a plurality of modules, with each module including a base suitable for supporting the module on the seabed, a gently sloping seaward face extending above the base from one end, and a sloping beachward face extending above the base from the opposite end. The tops of the seaward and backward face meet to form a top section and at the top portion of the beachward face at the top section there is a transversely disposed concave cutout that extends across the beachward face. The cutout causes backwash water to swirl in it which removes a significant amount of the nourishment sand that is in backwash water. The cutout has two spaced apart vertically extending concave channels that connect to respective openings in the top of the module. The concave channels direct backwash water through the openings in the top of the module and these high pressure streams allow backwash water to pass seaward over the breakwater but significantly reduces the amount of nourishment sand in the backwash that passes over the breakwater to seaward.

55 Claims, 5 Drawing Sheets

ORIGINAL AND INITIAL FILLED PROFILE

BREAKING WAVES CAUSE LOCAL SCOUR SHOREWARD OF BREAKWATER AND SEAWARD TRANSPORT

LOCAL SCOUR PROGRESSES LANDWARD

FINAL EQUILIBRIUM PROFILE

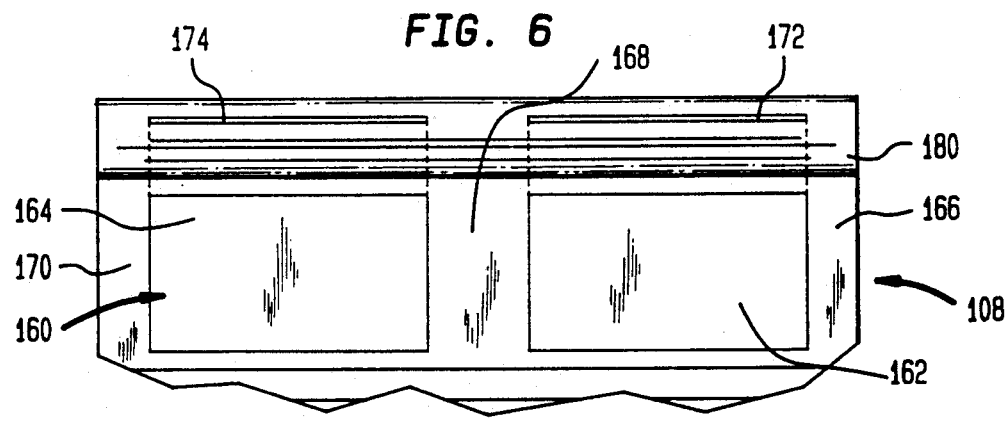
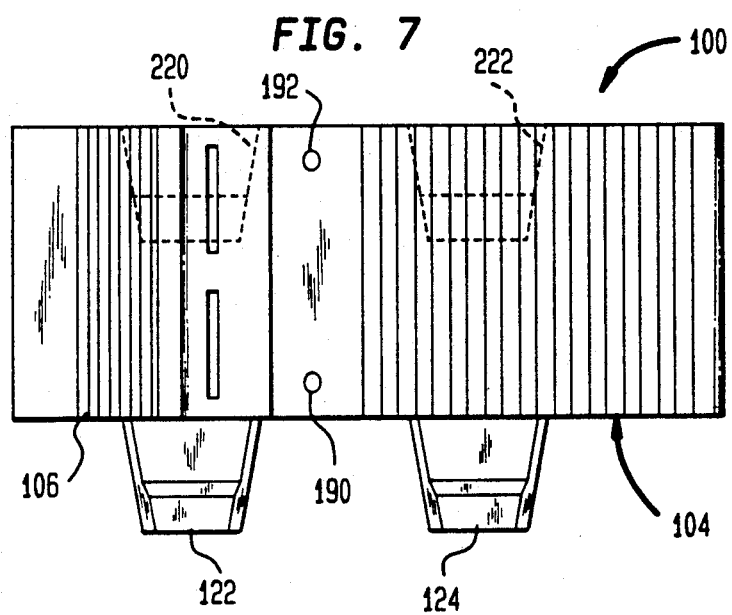
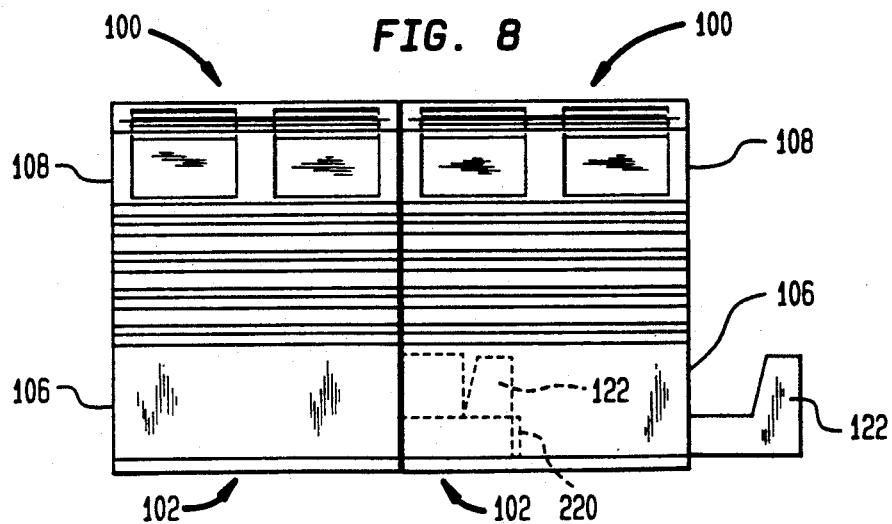

FINAL EQUILIBRIUM PROFILE 5,238,326

1

SUBMERGED BREAKWATER FOR USE AS A PERCH FOR SAND RETENTION

FIELD OF THE INVENTION

The present invention relates to breakwaters that are used as perches to reduce the amount of nourishment sand that is lost due to eddy/wave action.

BACKGROUND OF THE INVENTION

It has been known to replenish sand to eroded beaches to restore such beaches to their original sand profile before the erosion began. There has been a number of methods that have been attempted to prevent the erosion of nourishment sand. A known method has been to construct a "perch" to retain the nourishment sand. This perch may be formed from rocks or some other type of submerged offshore breakwater. One of the problems that has arisen is that when conventional submerged breakwaters have been used as a perch to prevent the loss of nourishment sand, they failed in this endeavor. Therefore, after a relatively short period of time all of the nourishment sand will have washed away and the beach will be back to its original sand profile before nourishment.

FIGS. 1A, 1B, 1C, and 1D graphically show the progression of erosion of nourishment sand when a conventional breakwater structure is used. Referring to FIG. 1A, this figure depicts the initial situation just after nourishment sand has been filled behind a conventional breakwater to raise the sand profile. At this time, there is no erosion of the nourishment sand behind the breakwater. Beach replenishment in this fashion is cost effective only as long as the nourishment sand is retained for a reasonable period of time.

Referring to FIG. 1B, as each wave passes over the submerged breakwater, an eddy is formed behind the breakwater. This eddy scours nourishment sand in this area behind the breakwater. The nourishment sand that is scoured by the eddy is transported from behind the breakwater by the wave backwash. This backwash transports the scoured nourishment sand seaward over the top of the breakwater.

Referring to FIG. 1C, the wave eddy and backwash cause progressive erosion in the landward direction of the nourishment sand behind the breakwater. The wave eddy and backwash also progressively scour deeper down behind the breakwater at the beachward face of the breakwater. The nourishment sand that is scoured from behind the breakwater due to the progressive erosion is transported by the combined eddy/backwash action to the seaward side of the breakwater. This sand may be deposited on, or seaward of, the seaward face of the breakwater. The depositing of this sand, as shown in FIG. 1C, results in reducing the efficiency of the breakwater.

Referring to FIG. 1D, the final equilibrium sand profile is shown for the situation when a conventional breakwater is used as a perch. As is shown in FIG. 1D, more than half of the nourishment sand has been lost due to the eddy/backwash action scouring nourishment sand from behind the breakwater. This scouring and nourishment sand loss extends all the way landward to the water's edge.

In a typical situation, this equilibrium condition will be reached in the first year after the nourishment sand has been filled behind the breakwater. Even though the equilibrium condition in FIG. 1D is reached, in four to eight years, even the remaining nourishment sand will be eroded away and only the original sand profile will be left.

Accordingly, there is a need for a submerged breakwater that may be used as a perch that will greatly reduce the erosion caused by the combined eddy/backwash action of waves passing over the submerged breakwater, thereby retaining more of the nourishment sand for a much longer period of time.

SUMMARY OF THE INVENTION

The present invention is a submerged modular breakwater that may be used as a perch for retaining nourishment sand that has been supplied to a beach to raise the sand profile. The breakwater of the present invention is formed from a plurality of modules. Each module includes a base suitable for supporting the module on the seabed, a gently sloping seaward face that extends above the base from one end, and a sloping beachward face that extends above the base from the opposite end. The tops of the seaward and backward faces meet to form a top section that has features important to the present invention.

The seaward face has a transversely extending concave surface at its top portion. This concave surface is for directing fluid currents over the top edge of the module and away from the beachward face. The concave surface also reduces the velocity of the waves passing over the breakwater and this minimizes the velocity of currents that may reach the nourishment sand behind the breakwater via any eddy. The seaward face also has a plurality of parallel, spaced apart, transversely disposed wave dissipation grooves disposed between the seaward toe of the seaward face and the bottom of the transversely disposed concave surface.

The beachward face has a plurality of sand retaining-/wave dissipation grooves disposed across a center portion. The top portion of the beachward face has a transversely disposed concave cutout that extends across the beachward face. The cutout has two spaced apart, vertically extending concave channels that connect to respective openings in the top of the breakwater module. These concave channels direct backwash water through the openings in the top of the module.

The concave cutout causes backwash water that enters it to move in a swirling motion. This removes a significant amount of sand nourishment from this backwash water. Some of the backwash water in the concave cutout is forced in the concave channels and form high pressure streams that exit through the openings in the top of the breakwater module. These high pressure streams allow backwash water to pass seaward over the breakwater module but significantly reduce the amount of nourishment sand that accompanies the backwash water that passes over the breakwater in the seaward direction.

When the breakwater modules are positioned in a side-by-side relation, adjacent modules are coupled by cooperating mortises and tenons. The tenons are L-shaped and extend from one side of the module base and the mortises are configured in the opposite side of the module base. This coupling arrangement permits the breakwater assembler to be able to very easily align and couple adjacent modules.

The breakwater of the present invention also has a means that is disposed across the openings between adjacent modules so that sand that accompanies backwash water does not pass between modules. This assists in retaining the nourishment sand that ordinarily would be lost.

The present invention will be described in detail in the remaining portions of the specification referring to the drawings.

BRIEF DESCRIPTION OF THE DRAWINGS

FIG. 6 is a rear view of the top portion of the beachward face of a module of the breakwater of the present invention.

FIG. 7 is a top perspective view of a module of the breakwater of the present invention showing the tenons and mortises (in phantom) that are used for connecting adjacent modules.

FIG. 8 is a rear view of adjacently coupled modules of the breakwater of the present invention.

DETAILED DESCRIPTION OF THE DRAWINGS

The present invention is a modular breakwater that is used as a perch for retaining nourishment sand of the beach.

Figure 9:
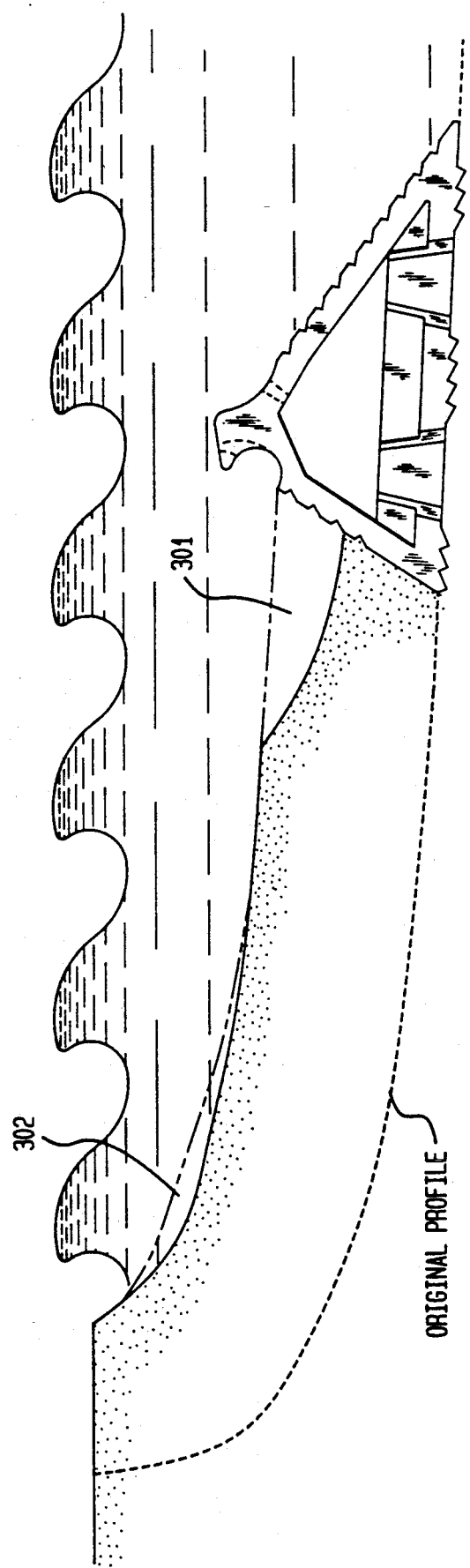
FIG. 9 shows the equilibrium condition and the resulting sand profile for a beach when the nourishment sand has been retained by the modular breakwater of the present invention.

The modular breakwater of the present invention consists of a plurality of coupled modules. These modules when coupled form the continuous breakwater of the present invention. This breakwater of the present invention performs wave dissipation and wave directing functions as well as reducing the amount of nourishment sand that is lost due to eddy/backwash action caused by waves that pass over the breakwater. The modules that form the breakwater of the present invention will be described referring to FIGS. 2 to 8. FIG. 9, which shows the equilibrium condition sand profile for a beach where the breakwater of the present invention is used, will then be discussed.

Figure 2:
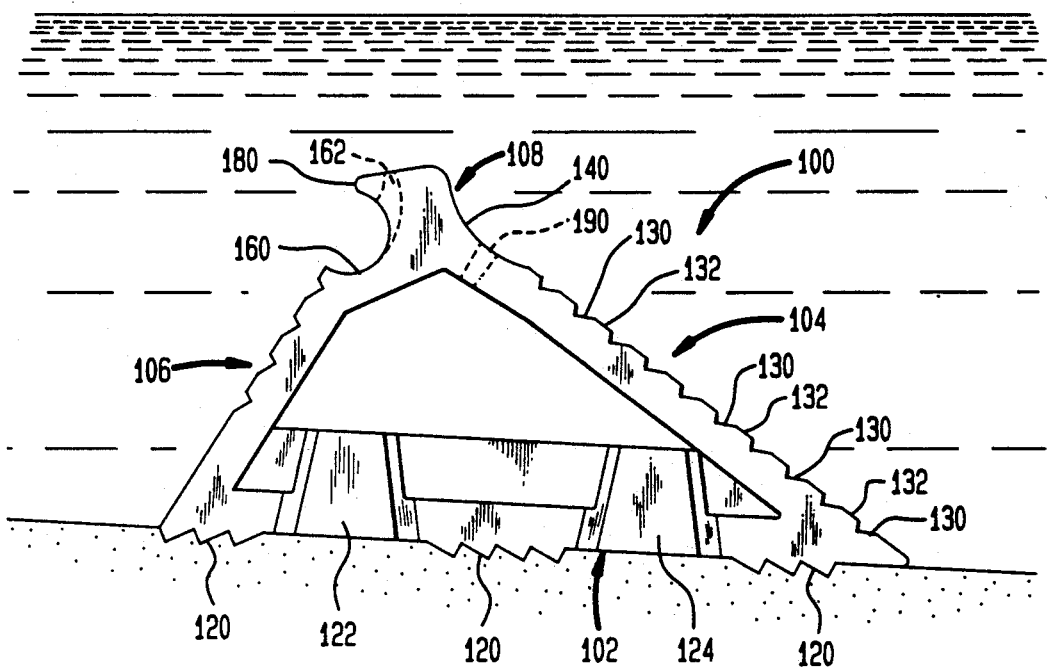
FIG. 2 is a left end view of a module of the breakwater of the present invention

Referring to FIG. 2, a left end view of a module that is used to form the modular breakwater of the present invention is shown generally at 100. Module 100 has base 102, gentle sloping seaward face 104, and sloping beachward face 106. As shown, module 100, formed by base 102, seaward face 104, and beachward face 106, generally has a triangular-prismatic shape. The seaward and beachward faces meet to form top section 108 that is configured for reducing the amount of nourishment sand in the backwash that is able to pass over the breakwater to seaward.

Base 102 is configured to rest on the sea bottom. Base 102 has anchoring structures 120 disposed at the bottom that assist in keeping each module in the location where it is placed. Preferably, anchoring structures 120 are in the form of anchoring or gripping feet such as those shown in FIG. 2. These feet have a saw tooth configuration and extend across the width of the module. Because objects positioned on the sea bottom have a tendency to be drawn seaward by wave backwash and the modules are subject to incoming wave action, anchoring or gripping feet 120 are pointed seaward and beachward.

Base 102 has tenons 122 and 124 that extend from the left side. Base 102 also has mortises 220 and 222 (FIG. 3) disposed in the right side. The mortises and tenons, and their interlocking relationship will be described more fully when discussing FIGS. 7 and 8.

Figure 4:
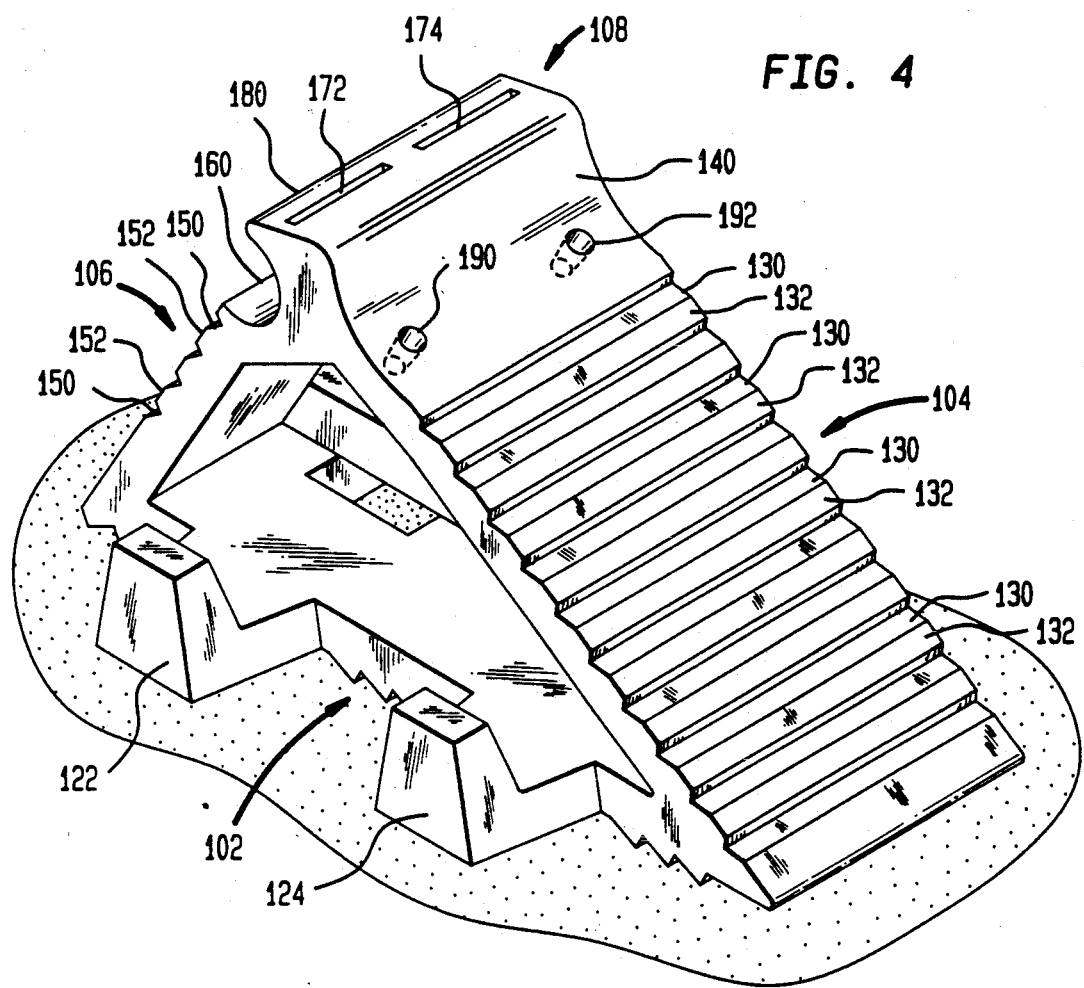
FIG. 4 is a top left front perspective view of a module of the breakwater of the present invention.
Figure 5:
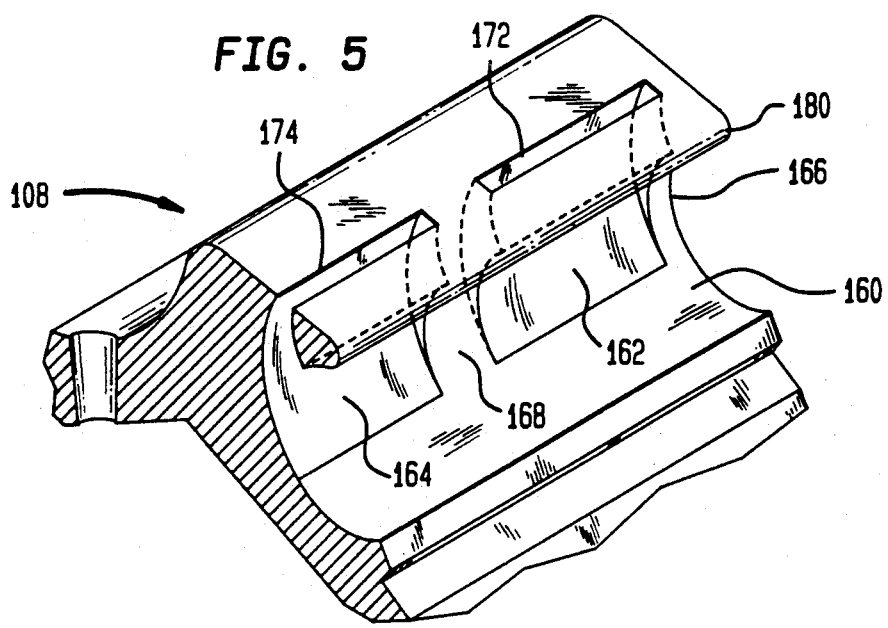
FIG. 5 is a cut away perspective view of the top portion of the beachward face of a module of the breakwater of the present invention.

Referring to FIGS. 2 and 4, seaward face 104 of module 100 will be described. Seaward face 104 of module 100 has wave dissipation means transversely disposed across it. These wave dissipation means are in the form of parallel, spaced apart, triangular grooves 130 that are separated by lands 132. Wave dissipation grooves 130 with lands 132 therebetween serve to dissipate the wave energy of incoming waves as these waves run up seaward face 104. Wave dissipation grooves 130 do this without creating secondary reflective wave energy. A washboard configuration or a system of small surface protrusions or bumps may be used to replace the configuration of transversely disposed parallel, spaced apart, grooves with lands therebetween that are part of module 100 shown in FIGS. 2 and 4.

Wave dissipation grooves 130 with lands 132 therebetween also serve to release silt or sand that is suspended in the water such that the silt and sand slide down the seaward face to replenish the sand that has been removed from adjacent the seaward toe of module 100. This overcomes the affect of toe scour at the seaward toe.

Seaward face 104 has transversely disposed deflector 140 that is located between the top of the series of wave dissipation grooves 130 and the top of module 100. Preferably, deflector 140 is in the form of a transversely disposed, recessed, concave member. As shown in FIGS. 2 and 4, concave deflector 140 extends the entire width of seaward face 104 and has a substantially constant radius of curvature.

The curvature of concave deflector 140 is such that an incoming wave is deflected over the top of module 100 and away from the nourishment sand behind the breakwater of the present invention. Preferably, a line tangent to the upper most portion of concave deflector 140 forms an angle with a vertical line that is normal to the plane of base 102 of at least 30 degrees. Moreover, concave deflector 140 prevents high velocity currents and eddies from developing any sufficient strength at the beachward face of module 100.

Figure 3:
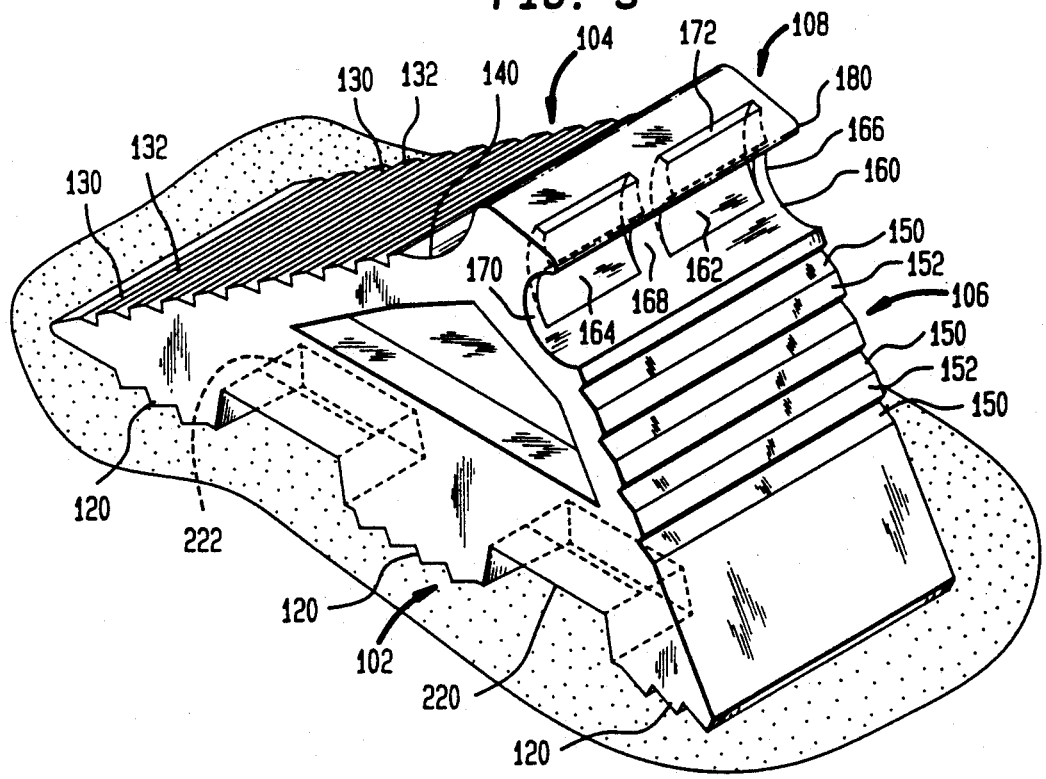
FIG. 3 is a top right rear perspective view of a module of the breakwater of the present invention.

Beachward face 106 will be described referring to FIGS. 2 and 3. Beachward face 106 forms a steeper angle with base 102 than seaward face 104. A center portion of beachward face 106 has a plurality of transversely disposed, parallel, spaced apart, triangular grooves 150 extending the width of module 100. Grooves 150 have lands 152 between them. Grooves 150 are sand retaining/wave dissipating grooves that are used to catch sand, silt, or the like in the backwash to help retain the nourishment sand behind the breakwater and dissipate the backwash to some degree.

The top portion of beachward face 106, above transversely disposed grooves 150 at top section 108, will be described referring to FIGS. 2, 3, 4, 5, and 6. The top portion of beachward face 106 at top section 108 includes transversely disposed concave cutout 160. Concave cutout 160 is much deeper than concave deflector 140. Concave cutout 160 caused the backwash water that enters it to move in a swirling motion. This causes the captured backwash water to release a significant amount of the nourishment sand that it is carrying.

Concave cutout 160 has vertically disposed concave channels 162 and 164 cut into it. Channel 162 is defined by side member 166 and center member 168, and channel 164 is defined by side member 170 and center member 168. Center member 168 separates the two concave channels.

Channel 162 reduces in rectangular cross-sectional size as it approaches opening 172 at the top of module 100. In a similar manner, channel 164 reduces in rectangular cross-sectional size as it approaches rectangular opening 174. The shape of these channels will cause a portion of backwash water in concave cutout 160 to be forced into them. This backwash water will be emitted from rectangular openings 172 and 174 at high velocity. The high velocity flows formed from the backwash will allow backwash to flow over module 100 to seaward but reduce the amount of nourishment sand that accompanies this backwash. The nourishment sand from the backwash that is retained falls behind the module near the beachward face to replenish some of the scour that occurs. Also some of this nourishment sand is picked up by the next wave and carried landward and adds to the sand profile behind the breakwater.

Beachward face 106 at top section 108 has protruding ledge 180 disposed from the top of concave cutout 160. Protruding ledge 180 extends the width of the module and assists in channeling backwash water into concave cutout 160, and also concave channels 162 and 164 in cutout 160, and reducing the scour affects of any eddies that are formed.

Although the preferred embodiment of the present invention includes concave cutout 160, and concave channels 162 and 164 that connect to rectangular openings 172 and 174, respectively, it is to be understood that the top section of module 100 may have any configuration that results is substantially reducing the amounts of nourishment sand in the backwash that passes over the breakwater to seaward.

Even in light of module 100 of the breakwater of the present invention being configured to reduce the amount of nourishment sand being lost, some is lost. However, because of the configuration and operation of top section 108 of module 100, the velocity of the sand as it comes over module 100 is greatly reduced and in many cases will fall onto the seaward face of module 100. When the next wave rides up the seaward face and over the top of module 100, much of this sand is brought back over the module and added to the sand profile. This will be described in greater detail in discussing FIG. 9.

Referring to FIGS. 3, 4, 7, and 8, the connection of adjacent modules will be described. As stated, the breakwater of the present invention consists of a plurality of modules 100 that are adjacently disposed. These adjacently disposed modules are connected via tenons 122 and 124 that extend from the left side of base 102 and mortises 220 and 222 configured in the right side of base 102. Tenons 122 and 124 of one module fit into mortises 220 and 222 of an adjacent module, thereby disposing the modules in a side-by-side relationship as shown in FIG. 8. Tenons 122 and 124 are L-shaped. Mortises 220 and 222 are shown in phantom in FIGS. 7 and 8 and are formed in base 102 and an opening is provided in the base through which the vertical portion of the tenon extends.

Preferably, as shown in FIGS. 2, 3, 4, 7, and 8, each module has two tenons and mortises. However, it is understood that other coupling methods are possible within the scope of the present invention, and the number of mortises and tenons may be increased or decreased.

When the breakwater is formed from the plurality of adjacently disposed modules 100, there are small areas of separation between these adjacent modules. These separations can permit backwash water and the nourishment sand that it carries to flow through them. These flows can amount to significant amounts of nourishment sand being lost as the breakwater becomes longer and longer. To prevent this, a flexible material is disposed either over each seam between adjacent modules or a long sheet of this material is extended along the entire length of the breakwater over the beachward faces of the plurality of modules. In each case, however, the beachward face of the breakwater presents a continuous surface containing no areas of separation between adjacent modules.

The material has a thickness and flexibility that will allow it to conform to the shape of the beachward face. This material is disposed below the concave cutout 160 and extends over grooves 150 in beachward face 106. This material, in response to backwash water, will conform to the shape of these grooves, thereby the purpose of the grooves is not affected by the material. Preferably, this material is a filter fabric that is commercially available from EXXON Corporation.

Each module has holes 190 and 192 disposed in the seaward face at concave deflector 140. These holes are used for lifting the module for its placement in its position in the submerged breakwater of the present invention. Lifting straps or lifting cables can be inserted through holes 190 and 192 for the purpose of placement of the modules.

The size of the modules and materials used to make the modules may vary. Preferably, however, each of the modules is prepared using micro-silica concrete having a compression strength of 8000 PSI. This material provides a long life in the seawater environment for the modules made from it. As to size, base 102 is approximately 18 feet long and the module is approximately 8 feet high. Preferably, seaward face 104 forms an angle of about 25 degrees with base 102 and beachward face 106 forms an angle of about 40 degrees with base 102. Tenons 122 and 124 extend approximately 2 feet from the left side of base 102, and mortises 220 and 224 have a maximum depth of a little over 2 feet. Concave deflector 140 has a radius of curvature of about 36 degrees and concave cutout 160 has a radius of curvature of about 180 degrees. Each module weighs approximately 20 tons.

Figure 1A:
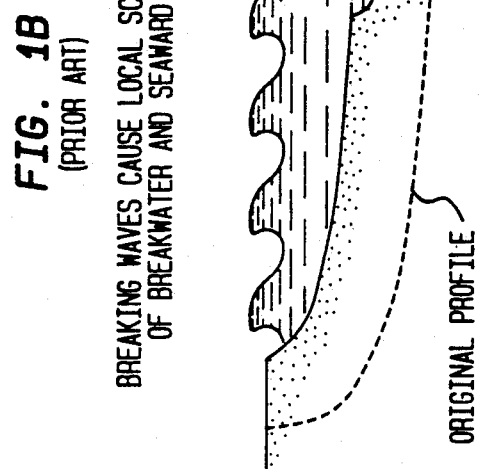
FIGS. 1A, 1B, 1C, and 1D depict the problems associated with using a conventional breakwater as a perch to retain nourishment sand that has been filled behind the breakwater to raise the sand profile.
Figure 1B:
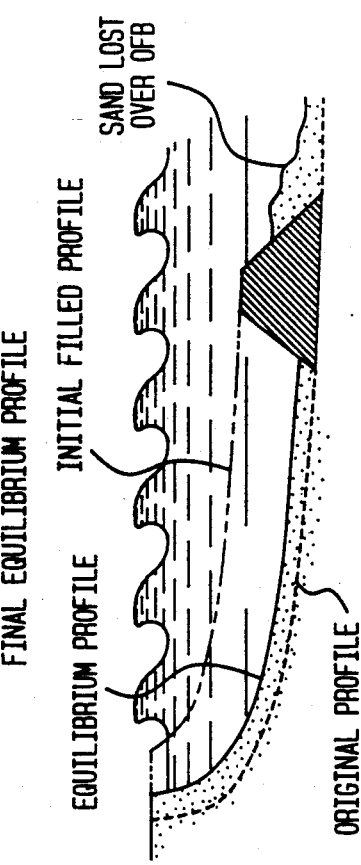
Figure 1C:
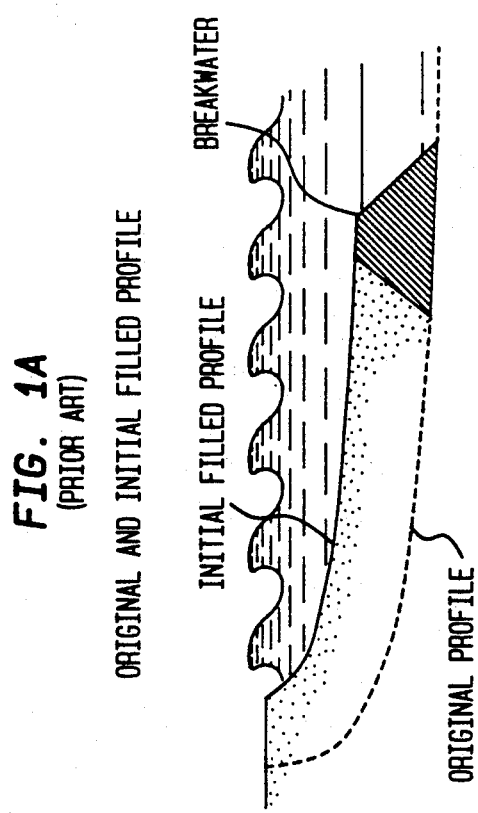
Figure 1D:
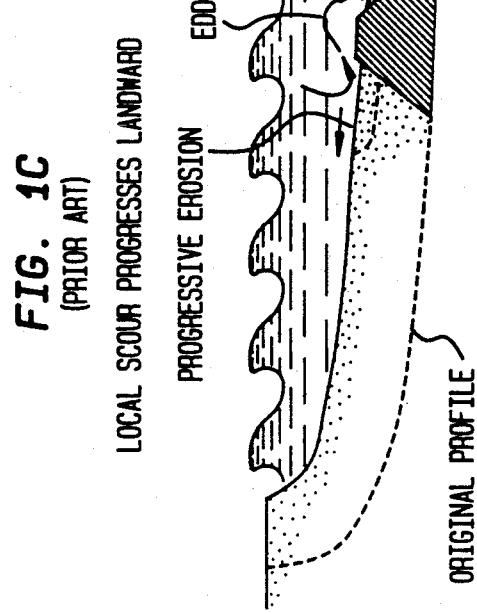

FIG. 9 depicts an equilibrium condition sand profile for a beach that has used the breakwater of the present invention as a perch. The initial sand profile for such a beach is similar to that shown in FIG. 1A, but a breakwater of the present invention is used. When the equilibrium condition in FIG. 9 is reached, there is some erosion behind the breakwater as shown at 300 in FIG. 9. A comparison of FIGS. 1D and 9 shows that erosion is significantly reduced when the breakwater of the present invention is used. The erosion or scour behind the breakwater of the present invention in the landward direction extends 1½ to 2 times the length of module. This scour will also extend down about ½ of the length of the beachward face. Furthermore, sand that is returned to the beachward side of the breakwater from the seaward face increases the sand profile as shown at 302. Therefore, the breakwater of the present invention significantly improves the retention of nourishment sand when it is used as a perch.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

I claim:

1. A submerged breakwater that is used for sand retention, the breakwater being formed from a plurality of modules, with each module comprising:
   a base with means for connecting the module to adjacently disposed modules;
   a sloping seaward face that slopes upwardly over the base from a first end of the base;
   a sloping beachward face that slopes upwardly over the base from a second end of the base; and
   a top section formed where a top portions of the seaward and beachward face meet, the top section includes means for permitting backwash water to pass over the module and for removing sand from the backwash water as such backwash water passes over the module.

2. The breakwater as recited in claim 1, wherein the base includes gripping members disposed on a bottom of the base for keeping the module in a predetermined position.

3. The breakwater as recited in claim 1, wherein the connecting means includes at least one tenon that extends from a first side of the base and at least on mortise that is configured in a second, opposite side of the base.

4. The breakwater as recited in claim 3, wherein the mortise has size that accommodates that receipt therein of the tenon.

5. The breakwater as recited in claim 1, wherein the seaward face further includes wave dissipating means disposed therein for dissipating the energy of incoming waves.

6. The breakwater as recited in claim 1, wherein the seaward face further includes wave directing means disposed therein for directing waves up and over the module away from the beachward face.

7. The breakwater as recited in claim 1, wherein the beachward face further includes sand retaining/wave dissipating means disposed therein for removing sand from the backwash and dissipating energy of the backwash.

8. The breakwater as recited in claim 1, wherein the top section at the beachward face further comprises,
   a transversely disposed concave member, and
   at least one vertically disposed concave channel disposed in the concave member that extends from concave member through a top section to an opening in the top of the module.

9. The breakwater as recited in claim 8, wherein the opening has a cross-sectional size that is smaller that the cross-sectional size of the concave channel at the concave member.

10. A module for used in a submerged breakwater that is used for sand retention, comprising:
    a base;
    a sloping seaward face that slopes upwardly over the base from a first end of the base;
    a sloping beachward face that slopes upwardly over the base from a second end of the base; and
    a top section formed where a top portions of the seaward and beachward face meet, the top section includes means for permitting backwash water to pass over the module and for removing sand from the backwash water as such backwash water passes over the module.

11. The module as recited in claim 10, wherein the base includes gripping members disposed on a bottom of the base for keeping the module in a predetermined position.

12. The module as recited in claim 10, wherein the base includes means for connecting the module to adjacently disposed modules.

13. The module as recited in claim 12, wherein the mortise has size that accommodates that receipt therein of the tenon.

14. The module as recited in claim 10, wherein the seaward face further includes wave dissipating means disposed therein for dissipating the energy of incoming waves.

15. The module as recited in claim 10, wherein the seaward face further includes wave directing means disposed therein for directing waves up and over the module away from the beachward face.

16. The module as recited in claim 10, wherein the beachward face further includes sand retaining/wave dissipating means disposed therein for removing sand from the backwash and dissipating energy of the backwash.

17. The module as recited in claim 10, wherein the top section at the beachward face further comprises,
    a transversely disposed concave member, and
    at least one vertically disposed concave channel disposed in the concave member that extends from concave member through the top section to an opening in a top of the module.

18. The module as recited in claim 17, wherein the opening has a cross-sectional size that is smaller that the cross-sectional size of the concave channel at the concave member.

19. The module as recited in claim 12, wherein the connecting means includes at least one tenon that extends from a first side of the base and at least on mortise that is configured in a second, opposite side of the base.

20. A submerged breakwater that is used for sand retention, the breakwater being formed from a plurality of modules, with each module comprising:
    a base with means for connecting the module to adjacently disposed modules;
    a sloping seaward face that slopes upwardly over the base from a first end of the base;
    a sloping beachward face that slopes upwardly over the base from a second end of the base; and
    a top section formed where a top portions of the seaward and beachward face meet, the top section includes a transversely disposed concave member and at least one vertically disposed concave channel disposed in the concave member that extends from the concave member through the top section to an opening in a top of the module, the top section for permitting backwash to pass over the module and for reducing an amount of sand in the backwash water from passing over the module with the backwash water.

21. The breakwater as recited in claim 20, wherein the base includes gripping members disposed on a bottom of the base for keeping the module in a predetermined position.

22. The breakwater as recited in claim 20, wherein the connecting means includes at least one tenon that extends from a first side of the base and at least on mortise that is configured in a second, opposite side of the base.

23. The breakwater as recited in claim 22, wherein the mortise has size that accommodates that receipt therein of the tenon.

24. The breakwater as recited in claim 20, wherein the seaward face further includes wave dissipating means disposed therein for dissipating the energy of incoming waves.

25. The breakwater as recited in claim 20, wherein the seaward face further includes wave directing means disposed therein for directing waves up and over the module away from the beachward face.

26. The breakwater as recited in claim 20, wherein the beachward face further includes sand retaining-/wave dissipating means disposed therein for removing sand from the backwash and dissipating energy of the backwash.

27. The breakwater as recited in claim 20, wherein the opening has a cross-sectional size that is smaller that the cross-sectional size of the concave channel at the concave member.

28. A module for used in a submerged breakwater that is used for sand retention, comprising:
   a base;
   a sloping seaward face that slopes upwardly over the base from a first end of the base;
   a sloping beachward face that slopes upwardly over the base from a second end of the base; and
   a top section formed where a top portions of the seaward and beachward face meet, the top section includes a transversely disposed concave member and at least one vertically disposed concave channel disposed in the concave member that extends from the concave member through the top section to an opening in a top of the module, the top section for permitting backwash water to pass over the module and for reducing an amount of sand in the backwash water from passing over the module with the backwash water.

29. The module as recited in claim 28, wherein the base includes gripping members disposed on a bottom of the base for keeping the module in a predetermined position.

30. The module as recited in claim 28, wherein in the base includes means for connecting the module to adjacently disposed modules.

31. The module as recited in claim 30, wherein the connecting means includes at least one tenon that extends from a first side of the base and at least on mortise that is configured in a second, opposite side of the base.

32. The module as recited in claim 31, wherein the mortise has size that accommodates that receipt therein of the tenon.

33. The module as recited in claim 28, wherein the seaward face further includes wave dissipating means disposed therein for dissipating the energy of incoming waves.

34. The module as recited in claim 28, wherein the seaward face further includes wave directing means disposed therein for directing waves up and over the module away from the beachward face.

35. The module as recited in claim 28, wherein the beachward face further includes sand retaining/wave dissipating means disposed therein for removing sand from the backwash and dissipating energy of the backwash.

36. The module as recited in claim 28, wherein the opening has a cross-sectional size that is smaller that the cross-sectional size of the concave channel at the concave member.

37. A submerged breakwater that is used for sand retention, the breakwater being formed from a plurality of modules, with each module comprising:
   a base with means for connecting the module to adjacently disposed modules;
   a sloping seaward face that slopes upwardly over the base from a first end of the base;
   a sloping beachward face that slopes upwardly over the base from a second end of the base; and
   a top section formed where a top portions of the seaward and beachward face meet, the top section includes means for causing sand in the backwash water that passes over the module to be suspended above the module so such sand may be picked up by a next wave and carried landward.

38. The breakwater as recited in claim 37, wherein the base includes gripping members disposed on a bottom of the base for keeping the module in a predetermined position.

39. The breakwater as recited in claim 37, wherein the connecting means includes at least one tenon that extends from a first side of the base and at least on mortise that is configured in a second, opposite side of the base.

40. The breakwater as recited in claim 39, wherein the mortise has size that accommodates that receipt therein of the tenon.

41. The breakwater as recited in claim 37, wherein the seaward face further includes wave dissipating means disposed therein for dissipating the energy of incoming waves.

42. The breakwater as recited in claim 37, wherein the seaward face further includes wave directing means disposed therein for directing waves up and over the module away from the beachward face.

43. The breakwater as recited in claim 37, wherein the beachward face further includes sand retaining-/wave dissipating means disposed therein for removing sand from the backwash and dissipating energy of the backwash.

44. The breakwater as recited in claim 37, wherein the top section at the beachward face further comprises,
   a transversely disposed concave member, and
   at least one vertically disposed concave channel disposed in the concave member that extends from concave member through the top section to an opening in a top of the module.

45. The breakwater as recited in claim 44, wherein the opening has a cross-sectional size that is smaller that the cross-sectional size of the concave channel at the concave member.

46. A module for used in a submerged breakwater that is used for sand retention, comprising:
   a base;

a sloping seaward face that slopes upwardly over the base from a first end of the base;

a sloping beachward face that slopes upwardly over the base from a second end of the base; and a top section formed where a top portions of the seaward and beachward face meet, the top section includes means for causing sand in the backwash water that passes over the module to be suspended above the module so such sand may be picked up by a next wave and carried landward.

47. The module as recited in claim 46, wherein the base includes gripping members disposed on a bottom of the base for keeping the module in a predetermined position.

48. The module as recited in claim 47, wherein the base includes means for connecting the module to adjacently disposed modules.

49. The module as recited in claim 48, wherein the connecting means includes at least one tenon that extends from a first side of the base and at least on mortise that is configured in a second, opposite side of the base.

50. The module as recited in claim 49, wherein the mortise has size that accommodates that receipt therein of the tenon.

51. The module as recited in claim 46, wherein the seaward face further includes wave dissipating means disposed therein for dissipating the energy of incoming waves.

52. The module as recited in claim 46, wherein the seaward face further includes wave directing means disposed therein for directing waves up and over the module away from the beachward face.

53. The module as recited in claim 46, wherein the beachward face further includes sand retaining/wave dissipating means disposed therein for removing sand from the backwash and dissipating energy of the backwash.

54. The breakwater as recited in claim 46, wherein the top section at the beachward face further comprises,
 a transversely disposed concave member, and
 at least one vertically disposed concave channel disposed in the concave member that extends from concave member through the top section to an opening in a top of the module.

55. The module as recited in claim 54, wherein the opening has a cross-sectional size that is smaller that the cross-sectional size of the concave channel at the concave member.

* * * * *